UNITED STATES PATENT OFFICE.

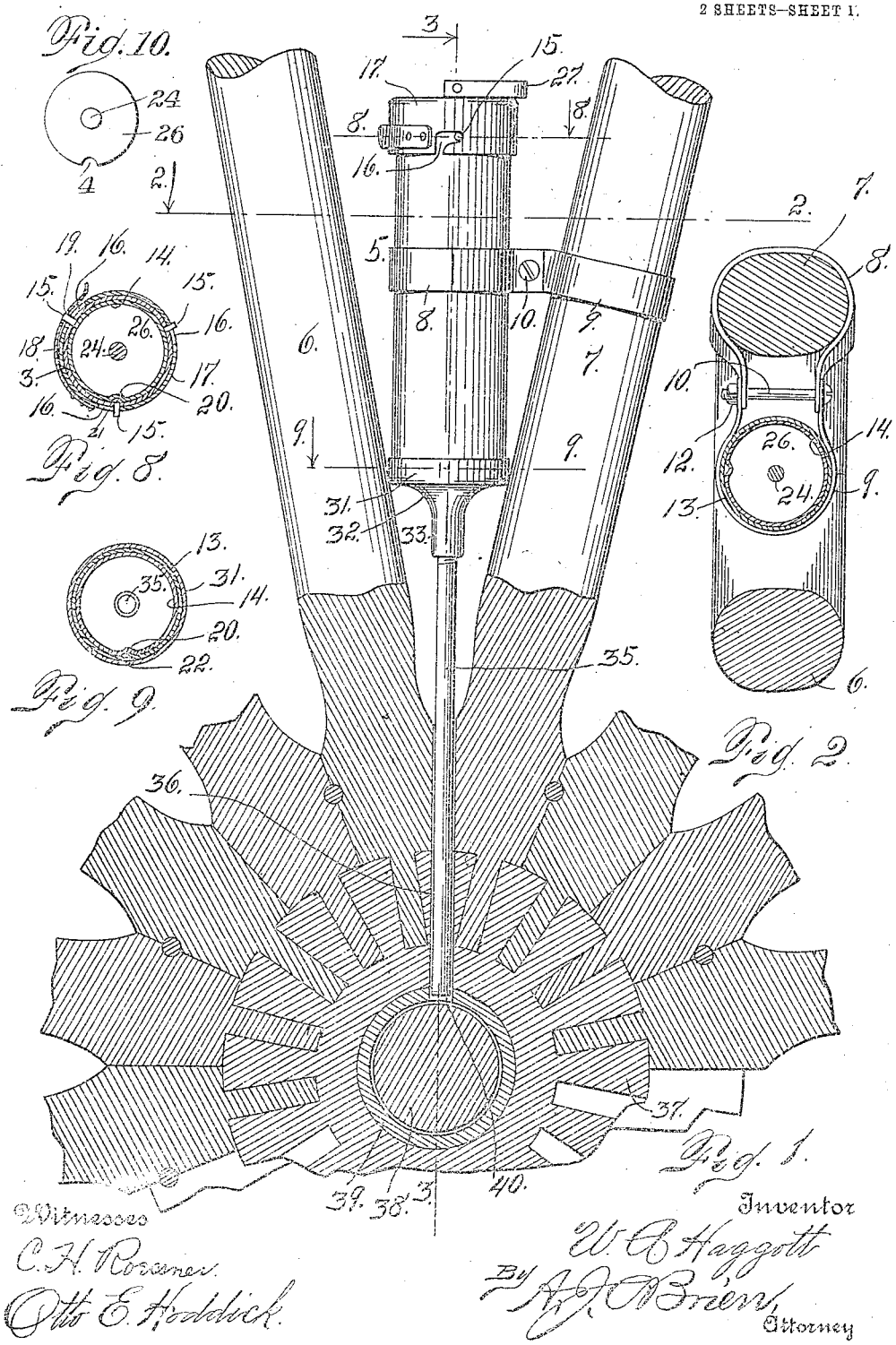

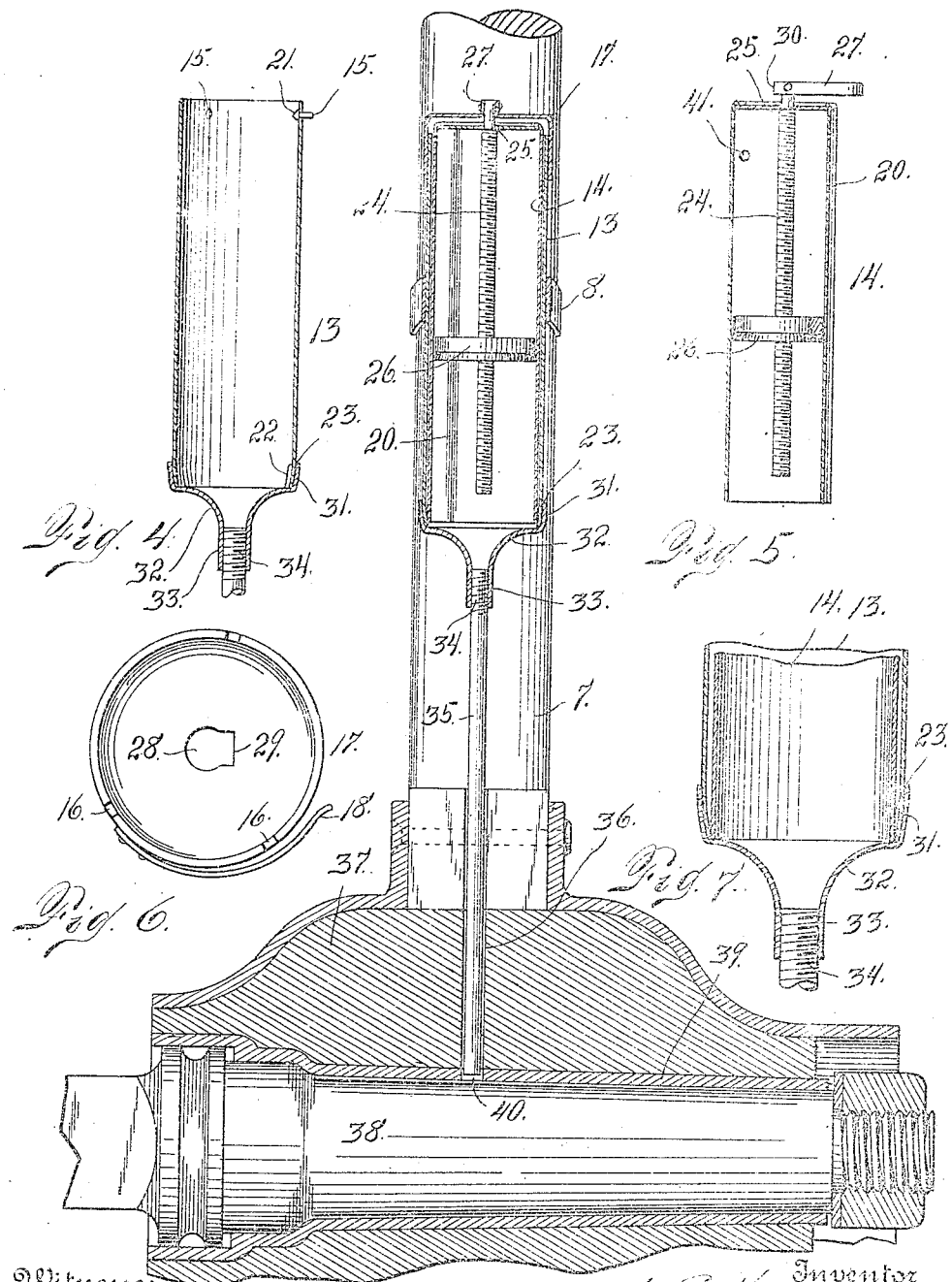

WARREN A. HAGGOTT, OF DENVER, COLORADO, ASSIGNOR TO THE H. & B. MANUFACTURING COMPANY, OF DENVER, COLORADO, A CORPORATION OF COLORADO.

JOURNAL-LUBRICATOR.

1,057,824.  Specification of Letters Patent.  Patented Apr. 1, 1913.

Application filed September 21, 1911. Serial No. 650,539.

*To all whom it may concern:*

Be it known that I, WARREN A. HAGGOTT, a citizen of the United States, residing in the city and county of Denver and State of Colorado, have invented certain new and useful Improvements in Journal-Lubricators; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in journal lubricators, more especially intended for use in connection with vehicle wheels.

The object of my present improvement is to prevent the lubricant receptacle from leaking, and to this end the inner tube of the receptacle is caused to wedge at its lower extremity into the outer tube, whereby it becomes impossible for the lubricant to work up between the two tubes. The lower extremity of the outer tube or casing is dented to fit closely into the longitudinal groove of the inner casing, said groove, by virtue of its engagement with a pin at the top of the outer casing, being locked against rotary movement within the outer casing during the rotation of the screw upon which the plunger of the inner tube is mounted.

Having briefly outlined my improved construction, I will proceed to describe the same in detail, reference being made to the accompanying drawing, in which is illustrated an embodiment thereof.

In this drawing: Figure 1 is a cross section taken through the hub of a vehicle wheel, showing my improved lubricating device in place and in elevation. Fig. 2 is a cross section taken on the line 2—2 of Fig. 1. Fig. 3 is a section taken on the line 3—3 of Fig. 1. Fig. 4 is a longitudinal section, taken through the outer tube or casing of the device. Fig. 5 is a similar section taken through the inner tube, showing the follower or plunger and the screw thread upon which it is mounted. Fig. 6 is an underneath view of the cap, shown on a larger scale than in Fig. 1. Fig. 7 is a fragmentary section, taken through the lower portion of the two tubes, the parts being shown on a larger scale and the space between the tube being somewhat exaggerated in order to distinctly illustrate the construction. Figs. 8 and 9 are cross sections, taken on the lines 8—8 and 9—9, respectively, of Fig. 1. Fig. 10 is a detail plan view of the follower for forcing the lubricant toward the hub.

The same reference characters indicate the same parts in all the views.

Let the numeral 5 designate the body portion of my improved lubricator, the same being located between two spokes 6 and 7 of a vehicle wheel and connected with the spoke 7 by means of two bands 8 and 9, passing respectively around the spoke 7 and the body 5 of the lubricator, the two bands being clamped upon their respective parts by means of a bolt 10 passed through registering apertures formed in the extremities of the said bands and fastened by a nut 12, which may be tightened for perfect security.

The body of the lubricating device is composed of an outer tube 13 and an inner tube 14, the outer tube being equipped with a number of pins 15 adapted to engage angular slots 16 formed in a cap 17 provided with a locking spring 18 perforated, as shown at 19, to receive one of the pins whereby the cap, after the pins have been properly adjusted to form the bayonet lock, is held securely in place. The inner tube 14 is provided with an exterior longitudinal groove 20, adapted to receive the inner protruding extremity 21 of one of the pins 15, when the parts are assembled, thus preventing the inner tube from turning within the outer tube for a purpose hereinafter explained. When the two tubes 13 and 14 are assembled, the lower extremity of the outer tube is indented, as shown at 22, whereby a tight joint is formed between the two tubes where the groove 20 is located, thus preventing the lubricant within the inner tube from entering the groove 20 at the bottom and working upwardly between the two tubes. The inner extremity of the outer tube is inwardly flared at the bottom, as shown at 23, and since the said outer tube is composed of sheet metal, it will be slightly yielding at that point, whereby, as the lower extremity of the inner tube approaches the bottom of the outer tube, during the assembling operation, the two tubes engage each other, and, by the time the inner tube is completely inserted, this engagement results in tightly wedging the two members together at the bottom whereby the lubricant is prevented from working upwardly between the two tubes, the dent 22 formed in the outer tube, whereby the material of the latter is forced into the lower extremity of the groove 20 of the member 14, contributing to this result.

Within the inner tube 14, a screw 24 is journaled at the top, as shown at 25. Threaded upon this screw within the tube 14 is a follower 26, adapted to eject the lubricant from the tube as the screw is rotated, whereby the follower is caused to travel downwardly through the inner tube. This follower has a groove 4 formed in its periphery, which engages the tongue 20 of the inner tube, as the said follower is caused to travel downwardly through the inner tube. To the upper extremity of the screw 24, outside of the cap 17, when the parts are assembled, is pivotally attached a U-shaped handle 27, which is adapted to facilitate the rotation of the screw for the purpose of actuating the follower. This handle member, when in position for actuating the screw, extends at right angles to the axis of the latter, while, when it is desired to remove the cap, the handle is brought into alinement with the screw, the top of the cap having an opening 28 large enough to receive said handle. This opening 28 is provided at one side with an extension 29 into which the inner extremity 30 of the handle protrudes when the latter is positioned to allow it to be brought into alinement with the screw. At all other times, the handle is prevented from assuming such position.

To the lower extremity of the outer tube 13 is secured, as shown at 31, a sort of neck 32, which is reduced, as shown at 33, to receive the upper extremity 34 of a pipe 35, which extends downwardly through an opening 36 formed in the hub 37 of the wheel, whose journal 38 is to be lubricated. This tube is open at both ends, and the metal lining 39 of the hub is perforated, as shown at 40, to allow the lubricant to pass to the journal.

From the foregoing description, the use of my improved device will be readily understood. Assuming that it is mounted upon the vehicle wheel in the manner heretofore described, the device is charged with lubricant by first removing the cap 17 and then detaching the inner tube 14. This may be done by throwing the handle 27 into alinement with the screw 24 and then inserting a nail or other suitable device between the two parts of the handle and pulling straight outwardly. Resort to this expedient will usually be found necessary, because of the fact that the two tubes are so closely fitted together at their inner extremities, in order to form a lubricant-tight joint, that there is considerable friction. After this tube 14 is removed, assuming that the follower 26 is located in the upper extremity of the tube, above a vent port 41, the tube 14 may then be charged with lubricant by pressing the tube into a quantity of relatively hard lubricant, with its open extremity foremost. The lubricant, by virtue of this manipulation, fills the tube from its lower extremity to the follower in the upper extremity, the air escaping during the filling operation through the vent port 41. The inner tube is then inserted in the outer tube and the cap replaced, after which the device is ready for use.

Having thus described my invention, what I claim is:—

1. A lubricator including an outer tube and an inner tube, the inner tube being exteriorly grooved longitudinally, the outer tube having a projection at the top engaging such groove to prevent the inner tube from turning within the outer tube, the inner tube being equipped with a screw journaled therein, a follower threaded on the screw, the inner tube having an interiorly-projecting longitudinally-disposed tongue adapted to enter a recess formed in the follower to prevent the latter from turning during the rotation of the screw to actuate the follower, substantially as described.

2. A lubricator comprising an outer tube and an inner tube, the inner tube having an exterior groove and an interior tongue, the outer tube having a pin projecting into the groove of the inner tube, the latter being equipped with a follower recessed to engage the tongue of the inner tube, the outer tube being dented at the bottom to cause the material to enter the groove of the inner tube, the outer tube being inwardly flared at the bottom to form a tight joint with the inner tube, for the purpose set forth.

In testimony whereof I affix my signature in presence of two witnesses.

WARREN A. HAGGOTT.

Witnesses:
F. E. BOWEN,
A. EBERT O'BRIEN.